US012229305B2

United States Patent
Carey et al.

(10) Patent No.: US 12,229,305 B2
(45) Date of Patent: Feb. 18, 2025

(54) SYSTEMS AND METHODS FOR REDACTED STATEMENT DELIVERY TO THIRD-PARTY INSTITUTIONS

(71) Applicant: JPMORGAN CHASE BANK, N.A., New York, NY (US)

(72) Inventors: Dave Christopher Carey, Middletown, DE (US); Alwin M Thomas, Newark, DE (US); Seun Akinyosoye, West New York, NJ (US); Amit Pendse, New Albany, OH (US); Derek McCoy, Powell, OH (US); Gagandeep Dua, Milburn, NJ (US); Arthur De Lotto, Gillette, NJ (US); Kathy S Wong, New York, NY (US); Rajesh Swamy, New York, NY (US); Ravneet Singh, Wood-Ridge, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 390 days.

(21) Appl. No.: 17/514,980

(22) Filed: Oct. 29, 2021

(65) Prior Publication Data
US 2023/0132634 A1 May 4, 2023

(51) Int. Cl.
*H04L 9/00* (2022.01)
*G06F 21/62* (2013.01)

(52) U.S. Cl.
CPC ................... *G06F 21/6245* (2013.01)

(58) Field of Classification Search
CPC .. G06F 21/6245; G06F 21/6254; G06Q 10/10
See application file for complete search history.

(56) References Cited

U.S. PATENT DOCUMENTS

| 10,169,315 B1 * | 1/2019 | Heckel ................... G06F 21/60 |
| 10,963,589 B1 | 3/2021 | Fakhraie et al. |

(Continued)

FOREIGN PATENT DOCUMENTS

WO     2017201292     11/2017

OTHER PUBLICATIONS

Redacting Documents and Records—Data Protection Commission—Date Published—Aug. 2021—URL: "https://www.dataprotection.ie/sites/default/files/uploads/2021-08/Redacting%20Documents%20and%20Records.pdf" (Year: 2021).*

(Continued)

*Primary Examiner* — Daniel B Potratz
*Assistant Examiner* — Syed M Ahsan
(74) *Attorney, Agent, or Firm* — GREENBERG TRAURIG LLP (57) ABSTRACT

Systems and methods for redacted statement delivery to third-party institutions are disclosed. A method may include: receiving a request for a statement from a third-party backend; retrieving a list comprising a plurality of available statements; providing the list of the plurality of available statements to the third-party backend; retrieving a selection of one of the plurality of available statements; identifying metadata for data fields in a statement template; generate the selected statement using the statement template and embedding the metadata in data fields of the statement; identifying a redaction reason; identifying redaction metadata associated with the redaction reason; redact data fields in the statement having metadata matching the redaction reason metadata; storing the redacted statement in a temporary store; and returning a path for the temporary store to the third-party backend, wherein the third-party backend may retrieve the redacted statement from the temporary store.

12 Claims, 3 Drawing Sheets

(56) References Cited

U.S. PATENT DOCUMENTS

2018/0144011 A1\* 5/2018 Felderman .......... G06F 16/2272
2019/0318122 A1\* 10/2019 Hockey .............. G06Q 20/3221
2021/0117562 A1\* 4/2021 Balan .................... H04W 12/08

OTHER PUBLICATIONS

International Search Report and Written Opinion of the International Searching Authority, dated Jan. 31, 2023, from corresponding International Application No. PCT/US2022/078738.

\* cited by examiner

SYSTEMS AND METHODS FOR REDACTED STATEMENT DELIVERY TO THIRD-PARTY INSTITUTIONS

BACKGROUND OF THE INVENTION

1. Field of the Invention

Embodiments relate generally to systems and methods for redacted statement delivery to third-party institutions.

2. Description of the Related Art

Statements from institutions, such as financial institutions, often include personal information. Third parties, such as aggregators, want the information, such as transaction data, in a statement, but should not have access to any unnecessary personal information.

SUMMARY OF THE INVENTION

Systems and methods for redacted statement delivery to third-party institutions are disclosed. According to one embodiment, a method for redacted statement delivery to third-party institutions may include: (1) receiving, at a statement engine computer program executed by a computer processor, a request for a statement from a third-party backend; (2) retrieving, by the statement engine computer program, a list comprising a plurality of available statements; (3) providing, by the statement engine computer program, the list of the plurality of available statements to the third-party backend; (4) retrieving, by the statement engine computer program, a selection of one of the plurality of available statements; (5) identifying, by the statement engine computer program, metadata for data fields in a statement template; (6) generating, by the statement engine computer program, the selected statement using the statement template and embedding the metadata in data fields of the statement; (7) identifying, by a redaction engine computer program, a redaction reason; (8) identifying, by the redaction engine computer program, redaction metadata associated with the redaction reason; (9) redacting, by the redaction engine, data fields in the statement having metadata matching the redaction reason metadata; (10) storing, by the statement engine computer program, the redacted statement in a temporary store; and (11) returning, by the statement engine computer program, a path for the temporary store to the third-party backend, wherein the third-party backend is configured to retrieve the redacted statement from the temporary store.

In one embodiment, the method may further include requesting, by the statement engine computer program, authorization to provide the list of the plurality of available statements to the third-party backend and/or authorization to make the redacted statement available to the third-party backend.

In one embodiment, the redaction reason may include a payment card industry compliance or a personal identifiable information compliance.

In one embodiment, the redaction reason is based on a type of third-party backend.

In one embodiment, the statement engine computer program validates a connection from the third-party backend before making the redacted statement available to the third-party backend.

In one embodiment, the method may further include deleting, by the statement engine computer program, the redacted statements from the temporary store.

According to another embodiment, a method for redacted statement delivery to third-party institutions may include: (1) receiving, at a statement engine computer program executed by a computer processor, a request for a statement from a third-party backend; (2) retrieving, by the statement engine computer program, a list comprising a plurality of available statements; (3) providing, by the statement engine computer program, the list of the plurality of available statements to the third-party backend; (4) retrieving, by the statement engine computer program, a selection of one of the plurality of available statements; (5) identifying, by the statement engine computer program, a plurality of data fields in a statement template to redact; (6) requesting, by the statement engine computer program, data for data fields other than the data fields to redact; (7) generating, by the statement engine computer program, the selected statement using the statement template and the retrieved data for the data fields other than the data fields to redact; (8) storing, by the statement engine computer program, the redacted statement in a temporary store; and (9) returning, by the statement engine computer program, a path for the temporary store to the third-party backend, wherein the third-party backend may be configured to retrieve the redacted statement from the temporary store.

In one embodiment, the method may further include requesting, by the statement engine computer program, authorization to provide the list of the plurality of available statements to the third-party backend and/or authorization to make the redacted statement available to the third-party backend.

In one embodiment, the data fields to redact may include Payment Card Industry data, personal identifiable information, and/or Health Insurance Portability and Accountability Act data.

In one embodiment, the statement engine computer program may validate a connection from the third-party backend before making the redacted statement available to the third-party backend.

In one embodiment, the method may further include deleting, by the statement engine computer program, the redacted statements from the temporary store.

According to another embodiment, an electronic device may include a memory storing a statement engine computer program and a redaction engine computer program and a computer processor. When executed by the computer processor, the statement engine computer program and/or the redaction engine computer program may cause the computer processor to: receive a request for a statement from a third-party backend; retrieve a list comprising a plurality of available statements; provide the list of the plurality of available statements to the third-party backend; retrieve a selection of one of the plurality of available statements; identify metadata for data fields in a statement template; generate the selected statement using the statement template and embedding the metadata in data fields of the statement; identify a redaction reason; identify redaction metadata associated with the redaction reason; redact data fields in the statement having metadata matching the redaction reason metadata; store the redacted statement in a temporary store; and return a path for the temporary store to the third-party backend, wherein the third-party backend may be configured to retrieve the redacted statement from the temporary store.

In one embodiment, the statement engine computer program may also cause the computer processor to request authorization to provide the list of the plurality of available statements to the third-party backend and/or authorization to make the redacted statement available to the third-party backend.

In one embodiment, the redaction reason may include a payment card industry compliance or a personal identifiable information compliance.

In one embodiment, the redaction reason may be based on a type of third-party backend.

In one embodiment, the statement engine computer program may validate a connection from the third-party backend before making the redacted statement available to the third-party backend.

In one embodiment, the statement engine computer program may also cause the computer processor to delete the redacted statements from the temporary store.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments relate generally to systems and methods for redacted statement delivery to third-party institutions. For example, embodiments may receive a request to provide a statement to a third-party from a customer, may acknowledge/validate the request, prepare the statement, save the statement in temporary storage, and notify the third-party that the statement is available for retrieval at a network location. In one embodiment, the statement may be redacted but may include a parameter for the third-party to identify the customer and/or account.

In embodiments, the network location may be restricted so that only the third-party identified in the request can access the statement, thereby adding security. Embodiments may further address issues associated with large statement files and latency issues that could impact service level agreements with the third-party. In embodiments, once the statement is retrieved, the statement may be removed from network location, thereby minimizing customer data exposure.

As used herein, the term "statement" may refer to bank statements (e.g., for financial accounts), but may encompass any sort of statement that may be provided and used by a third-party, such as a third-party. Examples may include financial statements, legal documents, tax documents, utility statements, educational transcripts or report cards, etc.

Figure 1:
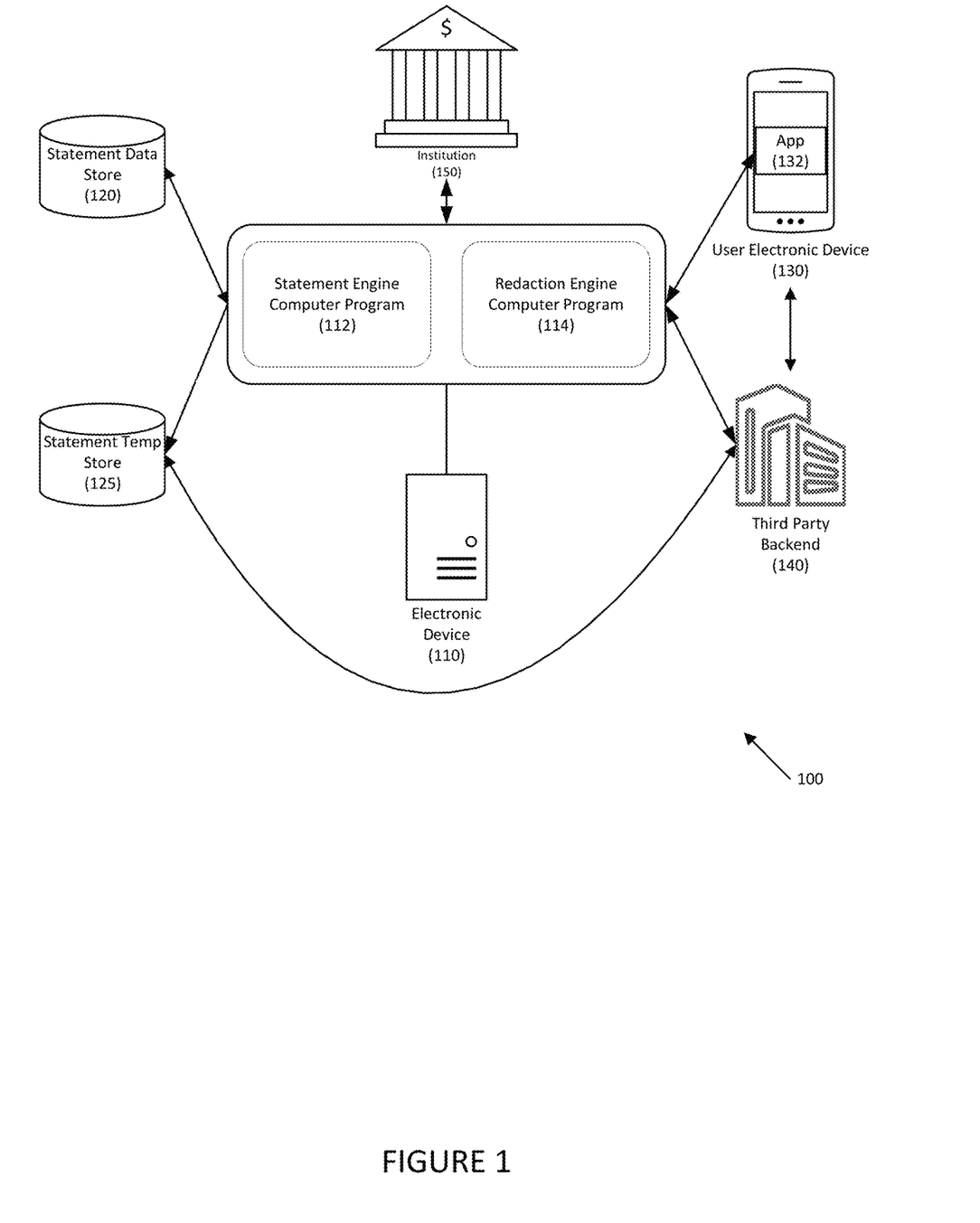
FIG. 1 is a depicts a system for redacted statement delivery to third-party institutions according to an embodiment.

Referring to FIG. 1, a system for redacted statement delivery to third-party institutions is disclosed according to an embodiment. System 100 may include electronic device 110 that may execute statement engine computer program 112 and redaction engine computer program 114 . . . . Electronic device 110 may be, for example, a physical server, a cloud-based server, combinations thereof, etc.

Institution 150 may be an institution that with which a customer may have an account. Examples include financial institutions and financial service providers, educational institutions, other service providers, etc.

Statement engine computer program 112 may receive a statement request from application 132 executed by user electronic device 130 or from third-party backend 140. In one embodiment, application 132 may be associated with the host of the statement engine, such as institution 150, third-party backend 140, etc. Statement engine computer program 112 may retrieve statement data for the requested statement from statement data store 120, may redact the statement, and may store the redacted statement in statement temporary store 125.

In one embodiment, statement data store 120 may store values for data fields in a statement. For example, statement data store 120 may store customer name values for one or more name data field, customer address values for address field(s), account number values for account fields, transaction values for transaction fields, etc. In one embodiment, statements may be generated by retrieving a statement template, identifying the data fields in the template, and retrieving the values for the data fields from statement data store 120.

In one embodiment, application 132 or third-party backend 140 may request a list of statements that are available for the customer, and statement engine computer program 112 may return a list to application 132 or third-party backend 140. Application 132 or third-party backend 140 may select the statement(s) for retrieval, and may return the selection to statement engine computer program 112.

In one embodiment, statement engine computer program 112 may prepare statements on a periodic basis (e.g., weekly, monthly, etc.) and may make them available to third-party backend 140.

Redaction engine computer program 114 may receive statements generated by statement engine computer program and may redact, obscure, or otherwise make unreadable certain data on the statements.

Figure 2:
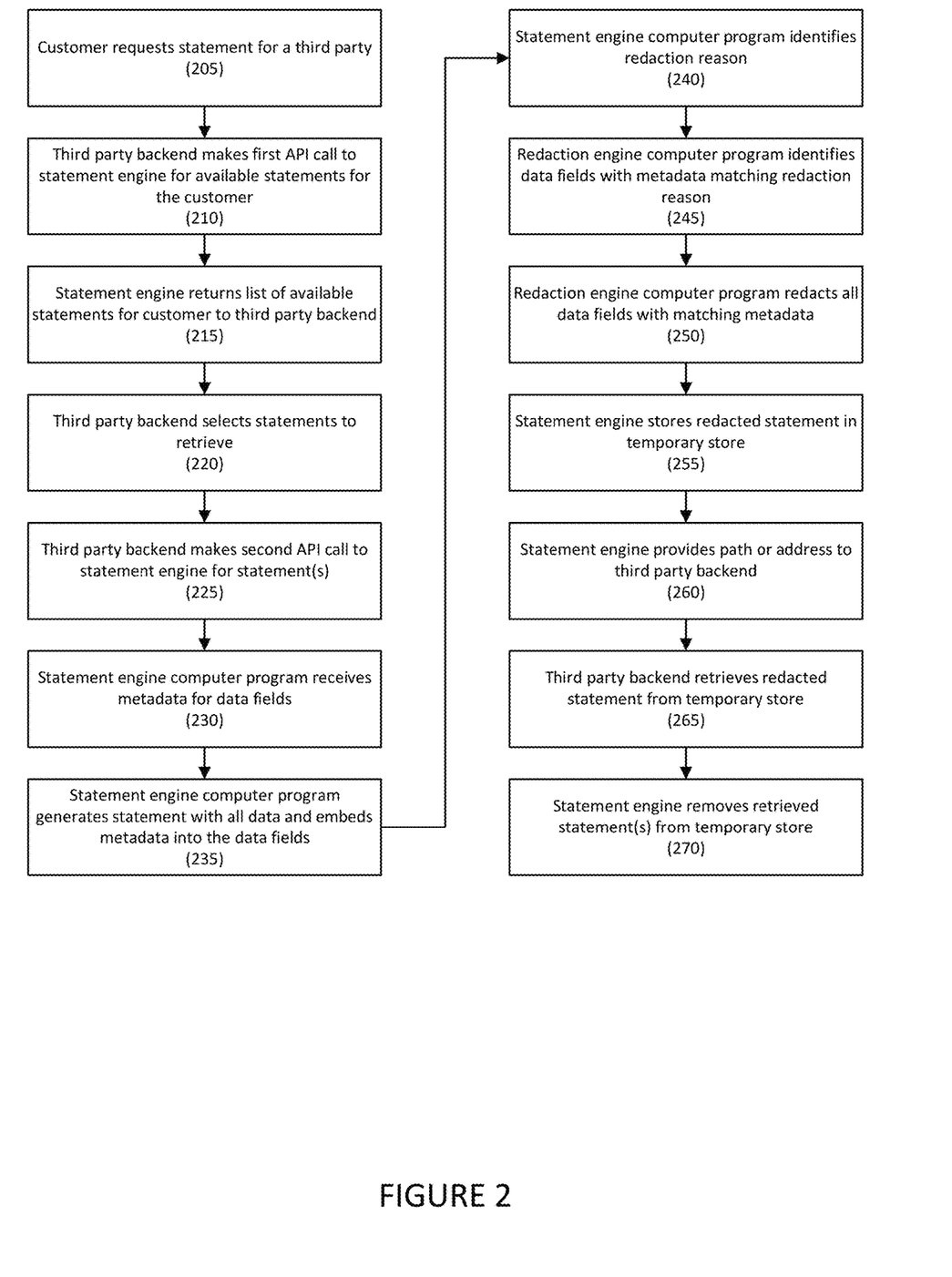
FIG. 2 depicts a method for redacted statement delivery to third-party institutions according to an embodiment.

Referring to FIG. 2, a method for redacted statement delivery to third-party institutions is disclosed according to an embodiment.

In step 205, a customer may request one or more statements from an institution (e.g., a financial institution, an educational institution, another service provider, etc.) using, for example, a computer program or application associated with a third-party. In one embodiment, the customer may identify specific statement(s) to retrieve (e.g., using date(s)). In another embodiment, the customer may authorize the third-party to retrieve some or all of the available statements and/or future statements.

In step 210, a backend for the third-party may make application programming interface (API) calls to a statement engine computer program. For example, a first API call may be for a list of available statements for the customer. In one embodiment, the API call may include an identifier for the customer and/or the customer account(s).

In step 215, the statement engine computer program may retrieve a list of available statements associated with the identifier for the customer and/or the customer accounts and may return the list to the third-party backend. For example, the statement engine computer program may access a database of customer statements and may identify the available statements by date or any other suitable identifier.

In one embodiment, statement engine computer program may return an identifier (e.g., a session identifier) with the list of available statements.

In one embodiment, the statement engine computer program may request authorization from the customer associated with the identifier for the customer and/or customer account(s) by, for example, SMS, email, in-app messaging, phone call, etc. before providing the list of available statements to the third-party backend.

In step 220, the third-party backend may select one or more statements from the list to retrieve. In one embodiment, the third-party backend may identify a specific statement by statement identifier (e.g., date), may identify the statements by date range, etc.

In step 225, the third-party backend may make a second API call to the statement engine computer program for the selected statements(s). In one embodiment, the third-party backend may return the identifier with the selection.

In one embodiment, instead of making two API calls, the third-party may make a single API call with a request for statements for a certain date, date range, etc.

In step 230, the statement engine computer program may receive metadata for data fields in a statement template. In embodiments, each data field may be associated with metadata that may specify whether the data field is redactable or not, and for what reason the redaction may occur. Examples of redaction reasons may include redaction for payment card industry (PCI) compliance purposes, redaction for PII compliance, etc.

In step 235, the statement engine computer program may generate one or more statements in an unredacted form and may embed the metadata in the data fields. The metadata may not be visible to an end-user, nor do they appear on the rendered statement, be it electronic or print rendition. Instead, the metadata may be hidden within the structure that comprises the electronic document itself.

In step 240, based on a redaction reason (e.g., an identity of the third-party, one or more policy (e.g., no PII is to be released), the type of data (e.g., PCI data), etc.), a redaction engine computer program may identify metadata for fields to be redacted.

In step 245, the redaction engine computer program may identify data fields with metadata matching the metadata associated with the redaction reason.

In step 250, the redaction engine computer program may redact all data fields having the matching metadata.

In step 255, the statement engine computer program may store the redacted statement(s) in a temporary store. For example, the redacted statement(s) may be stored in a folder, such as at a managed file transfer system address or path. In one embodiment, access to the redacted statement(s) may be restricted to the third-party backend.

In step 260, the statement engine computer program may return the path or address for the folder with the redacted statement(s) to the third-party backend.

In step 265, the third-party backend may access the path or address and may retrieve the redacted statement(s). In one embodiment, the third-party backend may provide credentials to access the redacted statement(s).

In one embodiment, statement engine computer program may validate the third-party backend's connection, may require proof of entitlement, etc. before making the redacted statement(s) available.

In step 270, once the redacted statements have been accessed or retrieved, the statement engine computer program may delete the redacted statements from the network location.

Figure 3:
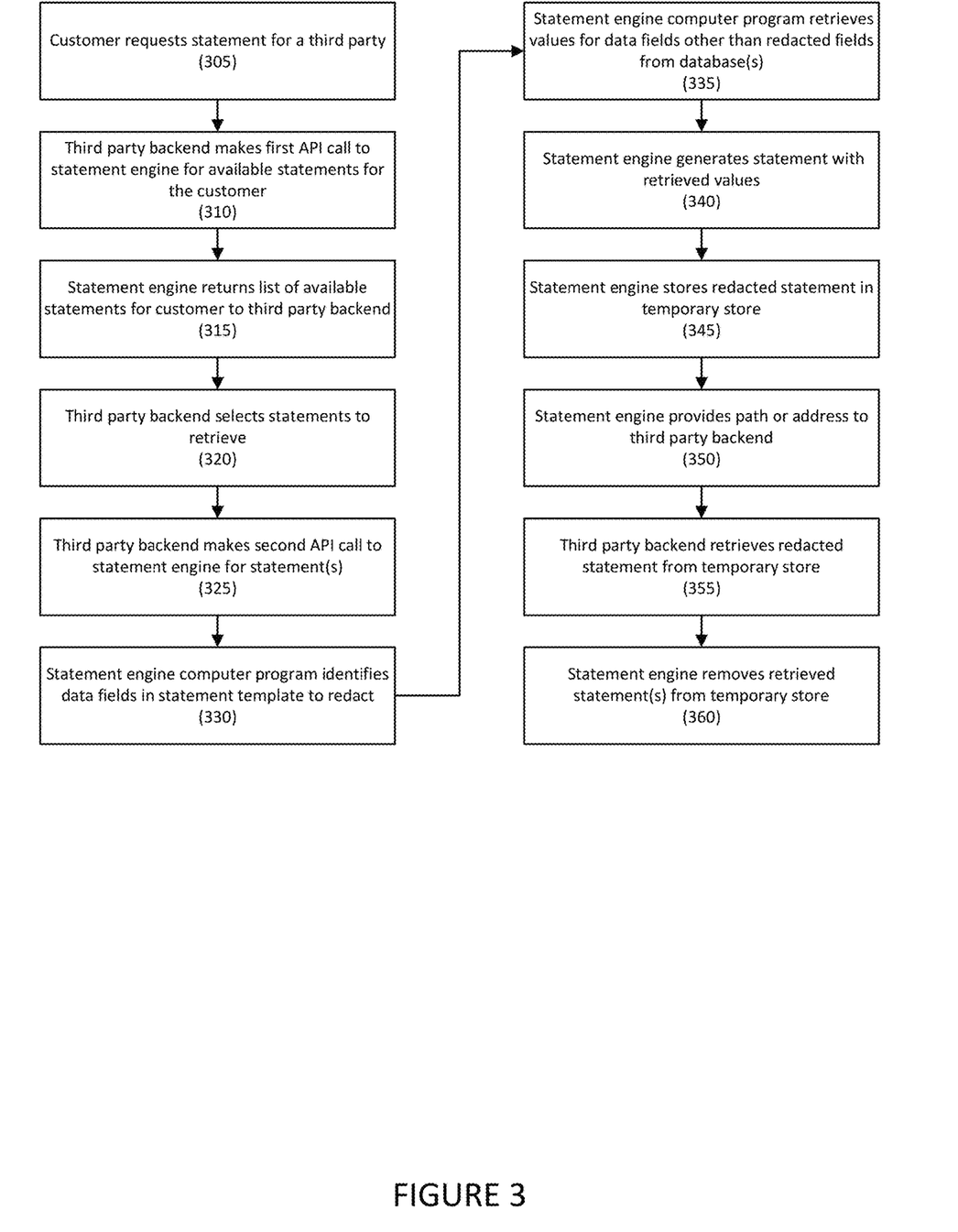
FIG. 3 depicts a method for redacted statement delivery to third-party institutions according to another embodiment.

Referring to FIG. 3, a method for redacted statement delivery to third-party institutions is disclosed according to another embodiment.

In step 305, a customer may request one or more statements from an institution (e.g., a financial institution, an educational institution, another service provider, etc.) using, for example, a computer program or application associated with a third-party. This may be similar to step 205, above.

In step 310, a backend for the third-party may make application programming interface (API) calls to a statement engine computer program. This may be similar to step 210, above.

In step 315, the statement engine computer program may retrieve a list of available statements associated with the identifier for the customer and/or the customer accounts and may return the list to the third-party backend. This may be similar to step 215, above.

In step 320, the third-party backend may select one or more statements from the list to retrieve. This may be similar to step 220, above.

In step 325, the third-party backend may make a second API call to the statement engine computer program for the selected statements(s). This may be similar to step 225, above.

In step 330, using the statement selection data, the statement engine computer program may identify field(s) in a statement template for the statements to redact. For example, the fields may be associated PII (e.g., customer name, address, social security number, date of birth, account number(s), etc.), PCI data (e.g., credit card data), information protected by the Health Insurance Portability and Accountability Act (HIPAA), etc. Any other suitable field may be identified as is necessary and/or desired.

In one embodiment, the customer may further specify data to redact, such as specific transactions, transactions with certain merchants, transactions within a date range, etc.

In step 335, the statement engine computer program may request data values for the fields in the template other than the redacted fields from one or more databases to generate the statement(s).

In step 340, the statement engine computer program may generate the statement(s) with the retrieved data values inserted into the fields other than the redacted field(s). In one embodiment, the redacted fields may be left blank, may be marked redacted, may be lined or blacked-out, etc.

In step 345, the statement engine computer program may store the redacted statement(s) in a temporary store. This may be similar to step 255, above.

In step 350, the statement engine computer program may return the path or address for the folder with the redacted statement(s) to the third-party backend. This may be similar to step 260, above.

In step 355, the third-party backend may access the path or address and may retrieve the redacted statement(s). This may be similar to step 265, above.

In step 360, once the redacted statements have been accessed or retrieved, the statement engine computer program may delete the redacted statements from the network location. This may be similar to step 270, above.

In one embodiment, rather than request statements each time one becomes available, the statement engine computer program may automatically redact and store a statement to a network location when it becomes available. In one embodiment, the statement engine computer program may require customer authorization before making the redacted statement available to the third-party.

In one embodiment, the statement engine computer program may generate and affix a digital watermark to the redacted statement. In another embodiment, the statement engine computer program may digitally sign the redacted statement.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for redacted statement delivery to third-party institutions, comprising:
   receiving, at a statement engine computer program executed by a computer processor for a financial institution, a request for a statement from a third-party backend;
   retrieving, by the statement engine computer program, a list comprising a plurality of available statements from the financial institution;
   providing, by the statement engine computer program, the list of the plurality of available statements to the third-party backend;
   receiving, by the statement engine computer program, a selection of one of the plurality of available statements from the third-party backend;
   identifying, by the statement engine computer program, metadata for data fields in a statement template;
   generating, by the statement engine computer program, the selected statement using the statement template and embedding the metadata in data fields of the selected statement, wherein the embedded metadata is not visible in the selected statement;
   identifying, by a redaction engine computer program, a redaction reason;
   identifying, by the redaction engine computer program, redaction metadata associated with the redaction reason;
   generating, by the redaction engine, a redacted statement by redacting one or more data fields of the data fields in the selected statement having embedded metadata matching the redaction reason metadata;
   storing, by the statement engine computer program, the redacted statement in a temporary store; and
   returning, by the statement engine computer program, a path for the temporary store to the third-party backend, wherein the third-party backend is configured to retrieve the redacted statement from the temporary store.

2. The method of claim 1, further comprising:
   requesting, by the statement engine computer program, authorization to provide the list of the plurality of available statements to the third-party backend and/or authorization to make the redacted statement available to the third-party backend.

3. The method of claim 1, wherein the redaction reason comprises a payment card industry compliance or a personal identifiable information compliance.

4. The method of claim 1, wherein the redaction reason is based on a type of third-party backend.

5. The method of claim 1, wherein the statement engine computer program validates a connection from the third-party backend before making the redacted statement available to the third-party backend.

6. The method of claim 1, further comprising:
deleting, by the statement engine computer program, the redacted statements from the temporary store.

7. An electronic device for a financial institution, comprising:
a memory storing a statement engine computer program and a redaction engine computer program; and
a computer processor;
wherein, when executed by the computer processor, the statement engine computer program and/or the redaction engine computer program causes the computer processor to:
receive a request for a statement from a third-party backend;
retrieve a list comprising a plurality of available statements;
provide the list of the plurality of available statements to the third-party backend;
receive a selection of one of the plurality of available statements from the third-party backend;
identify metadata for data fields in a statement template;
generate the selected statement using the statement template and embedding the metadata in data fields of the selected statement, wherein the embedded metadata is not visible in the selected statement;
identify a redaction reason;
identify redaction metadata associated with the redaction reason;
generate a redacted statement by redacting one or more data fields of the data fields in the selected statement having embedded metadata matching the redaction reason metadata;
store the redacted statement in a temporary store; and
return a path for the temporary store to the third-party backend, wherein the third-party backend is configured to retrieve the redacted statement from the temporary store.

8. The electronic device of claim 7, wherein the statement engine computer program further causes the computer processor to request authorization to provide the list of the plurality of available statements to the third-party backend and/or authorization to make the redacted statement available to the third-party backend.

9. The electronic device of claim 7, wherein the redaction reason comprises a payment card industry compliance or a personal identifiable information compliance.

10. The electronic device of claim 7, wherein the redaction reason is based on a type of third-party backend.

11. The electronic device of claim 7, wherein the statement engine computer program validates a connection from the third-party backend before making the redacted statement available to the third-party backend.

12. The electronic device of claim 7, wherein the statement engine computer program further causes the computer processor to delete the redacted statements from the temporary store.

* * * * *